Feb. 28, 1939.  G. BEISSER  2,148,923
APPARATUS FOR AUTOMATICALLY INDICATING THE WEIGHT OF THE PICKLING BRINE
TO BE SUPPLIED TO MEAT FOR THE PURPOSE OF PICKLING THE LATTER
Original Filed July 25, 1933    2 Sheets-Sheet 1
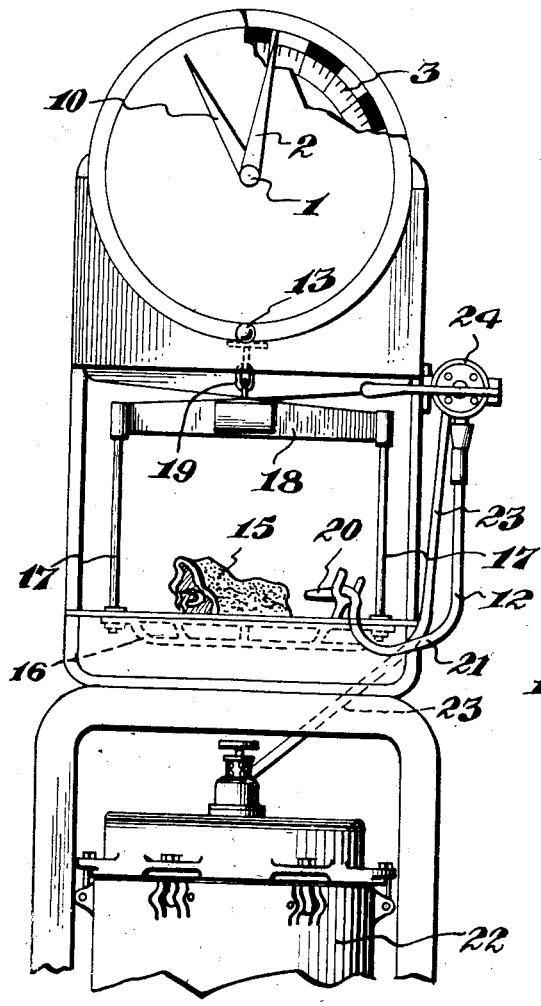
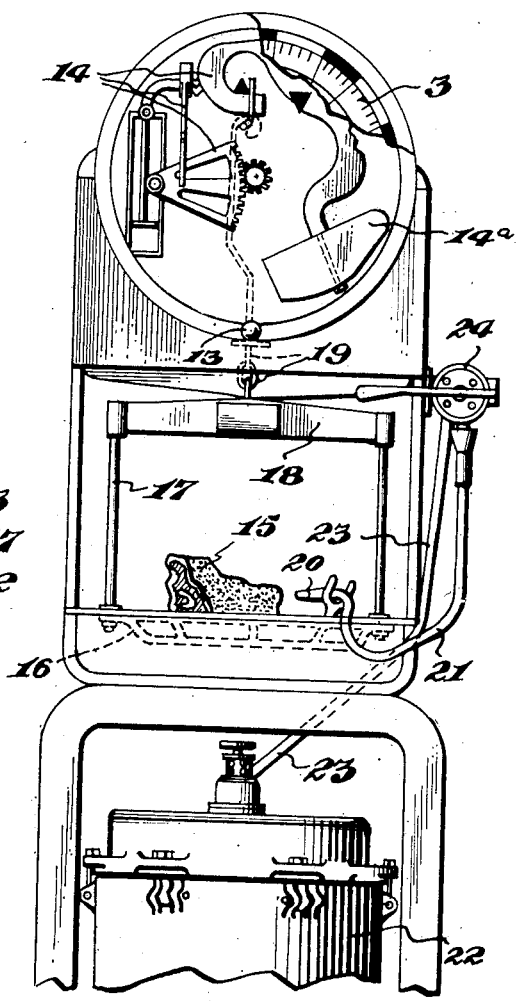
Inventor,
GEORG BEISSER, DECEASED,
BY CHARLOTTE BEISSER, ADMINISTRATRIX
BY Glascock Downing Seibold
ATTORNEYS.

Feb. 28, 1939.  G. BEISSER  2,148,923
APPARATUS FOR AUTOMATICALLY INDICATING THE WEIGHT OF THE PICKLING BRINE
TO BE SUPPLIED TO MEAT FOR THE PURPOSE OF PICKLING THE LATTER
Original Filed July 25, 1933  2 Sheets-Sheet 2

Inventor:
GEORG BEISSER, DECEASED,
By Charlotte Beisser
ADMINISTRATRIX.

Patented Feb. 28, 1939

2,148,923

UNITED STATES PATENT OFFICE 2,148,923

APPARATUS FOR AUTOMATICALLY INDICATING THE WEIGHT OF THE PICKLING BRINE TO BE SUPPLIED TO MEAT FOR THE PURPOSE OF PICKLING THE LATTER

Georg Beisser, deceased, late of Hamburg-Rahlstedt, Germany, by Charlotte Beisser, administratrix, Hamburg-Rahlstedt, Germany Original application July 25, 1933, Serial No. 682,156. Divided and this application November 10, 1936, Serial No. 110,174. Renewed December 30, 1938. In Germany June 24, 1930

7 Claims. (Cl. 116—129)

Weighing apparatus for automatically measuring the weight of the pickling brine to be supplied to meat for the purpose of pickling the latter are already well known, this forming a division from the co-pending application Serial No. 682,156, filed July 25, 1933 now Patent Number 2,074,884. In these devices the shutting off of the supply of brine is effected automatically as soon as the weight of brine introduced together with the original weight of the meat has attained a certain ratio to said original weight. These devices which act automatically are however comparatively complicated and therefore expensive, so that their introduction into small works is rendered difficult. On the other hand a simple balance cannot be employed for determining the weight of the brine introduced because the weights of the original meat vary and unskilled picklers cannot be expected to perform at the requisite speed and with the necessary accuracy the calculations required for the determination of the weight of the brine to be introduced. Moreover tables do not solve the difficulty because they become too cumbersome and difficult to consult if compiled for weights differing by very small amounts and moreover in the case of errors made on consulting said tables the pieces of meat treated would be rendered useless either through being oversalted or through being spoiled in consequence of having insufficient brine supplied to them. For the purpose of doing away with these difficulties it is proposed according to the present invention to provide a weighing device for automatically indicating the weight of the pickling brine to be supplied to the meat for the purpose of pickling the latter with a scale having graduations by means of which the ratio of the original weight of the meat to the sum of the weights of the meat and of the pickling brine is determined and can be read off with the aid of a pointer indicating the weight. The indication of the weight may moreover be effected directly by means of the pointer for the original weight or indirectly by means of a second pointer for the sum of the weights of the original meat and of the brine, which second pointer is co-ordinated to the weight pointer for the original weight and advances in front of this weight pointer by the distance corresponding to the weight of the brine to be introduced.

The accompanying drawings show by way of example one embodiment of the invention.

Figure 1 is a front elevation of the entire apparatus.

Fig. 4 is a similar view with a portion of the dial removed so as to expose the interior mechanism. In the different figures the same reference characters indicate the same elements.

An uncoupling device renders it possible to disengage the pointers from each other so that only the actual increase of weight is indicated. The weighing operation is as follows:

When the piece of meat to be pickled is placed on the weighing plate, the actual weight of the meat is indicated by the weight pointer. However, the second pointer simultaneously advances in front of the first weight pointer in dependence on the original weight so that the second pointer indicates that weight which the piece of meat must have by the supply of pickling brine in order to be sufficiently preserved and not oversalted. As soon as the distance between the first and second pointers indicates the weight of brine to be supplied to the piece of meat for the preservation thereof, it is only necessary to operate the uncoupling device and to supply the brine to the meat. By the supply of brine, the meat becomes heavy and under the influence of the increasing weight, the first pointer, which had hitherto indicated only the original weight, approaches the second pointer which indicates the final weight to be obtained and has maintained its position unchanged owing to the operation of the uncoupling device. As soon as the first pointer which indicates the actual weight i. e. the original weight plus the weight of the brine already introduced in the meat, has reached the second pointer, the supply of brine is cut off and the piece of meat thus pickled is available for further use. Both indicators are returned to the initial position and the device is ready for effecting a further pickling.

Figure 2:
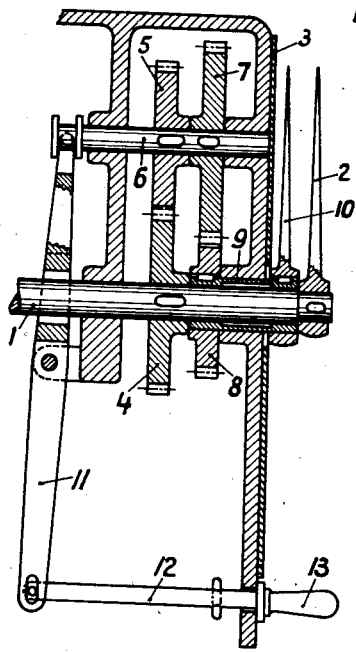
Fig. 2 is a vertical section of the preferred form of the automatic weight indicating apparatus with a first and a second pointer.
Figure 3:
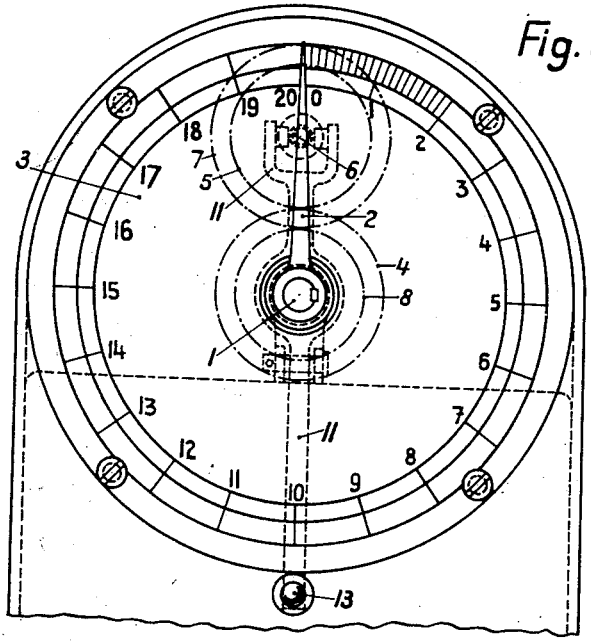
Fig. 3 is a fragmentary front elevation of the scale dial and pointers of the apparatus.

14 indicates the weighing mechanism arranged behind the scale 3 visible in Figures 2 and 3. The weighing device may be formed as a weight scale with the weight 14a. The piece of meat 15 to be pickled is placed on the plate 16 of the weighing device, the said plate being suspended from the weighing device 14 at 19 by means of the rods 17 and the member 18. The weight of the parts 16, 17, 18 and 19 is accounted for by adjusting the weighing device 14 so that the pointer 2 moves to zero when the plate 16 of the weighing plate is unloaded. The weight of the nozzle 20 for the brine and of the feed tube 21 is also accounted for by adjusting the weighing device 14. When the piece of meat 15 is placed on plate 16, pointer 2 indicates only the weight of this piece of meat. The brine is contained in the pressure vessel 22. The brine is supplied to the piece of meat 15 through tube 21, conduit 23 and hand operated valve 24. If when placing the untreated piece of meat 15 on the weighing plate, the weight pointer 2 moves over a certain area or field of the scale 3 according to Figures 1 and 2 and the pointer 10 simultaneously indicates the weight of the piece of meat plus the brine supplied which is required for the preservation, it is only necessary to uncouple or disengage the pointers 2 and 10 from each other by operating the handle 13 and the valve 24 and to supply brine to the piece of meat 15. While during the uncoupling or disengagement, the pointer maintains its position unchanged, the pointer 2 moves under the influence of the increasing weight of the piece of meat 15 toward the pointer 10. At the moment when both pointers are covered, the valve 24 is operated in such a manner that a further supply of brine is discontinued. The piece of meat 15 is then fully pickled so that it is preserved on the one hand and not oversalted on the other hand. The pickled piece of meat is then removed from the plate 16 of the weighing apparatus and the pointer 2 returns to zero. The superfluous brine, which issues especially from cut arteries and is not weighed, may be discharged over the plate of the weighing machine.

In the device as shown in Figs. 2 and 3, 1 indicates the spindle of the weighing mechanism on which spindle the pointer 2 is fixedly mounted. This pointer moves in front of a face 3 of different color, in order to enable the position of the weight pointer 2 to be seen more readily. That this face is formed as a weight scale, as shown in Fig. 3, is not requisite but is merely suitable because it is thus possible to employ the weighing device for the ordinary purposes of weighing definite weights. On the spindle 1 there is also keyed the toothed wheel 4 which engages a toothed wheel 5 keyed fixedly on the spindle 6. With the spindle 6 moves the toothed wheel 7, which is unable to rotate relatively to said spindle. Said wheel 7 engages with a toothed wheel 8, which is arranged concentrically with regard to the spindle 1 of the weighing mechanism. The toothed wheel 8 is firmly keyed to a sleeve 9, which carries a second pointer 10. The spindle 6 is mounted so as to be capable of being shifted longitudinally and can be so shifted by means of the two-armed lever 11, rod 12 and handle 13 whereby the spur wheels 5 and 7 come out of engagement with the spur wheels 4 and 8.

It will now be assumed that for the pickling of the meat brine equal in weight to 7 per cent of the original weight of the meat is to be introduced. In this case the toothed wheel, which is designated 4, has 30 teeth; the toothed wheel, which is designated 5, 29 teeth; the toothed wheel, which is designated 7, 30 teeth and the toothed wheel, which is designated 8, 29 teeth.

It is assumed that there is placed on the plate 16 of the weighing machine a piece of meat, the weight of which amounts to 10 kg. Accordingly the weight pointer 2 comes to the weight graduation 10 kg. in the scale illustrated in Fig. 3. The pointer 10, on account of the spindle 1 being connected with the sleeve 9 through the toothed wheels 4, 5, 7, 8, is brought to a position on the scale, which is calculated from the following:

$$10 \times \frac{30}{29} \times \frac{30}{29} = 10.70$$

The position of the pointer 10 consequently corresponds with the original weight of the meat placed upon the device plus 7 per cent. If now the pickler by drawing out the handle 13 uncouples the sleeve 9 from the spindle 1 and simultaneously admits the brine to the piece of meat, the pointer 10 remains unmoved, while the pointer 2 under the influence of the piece of meat which is becoming heavier and heavier on account of the brine supplied approaches the pointer 10 which has been advanced by 7 per cent. As soon as the pointers 2 and 10 coincide, the piece of meat has received brine equal in weight to 7 per cent of its original weight. At this instant the pickler closes the brine supply conduit and by striking the handle 13 couples together again the pairs of toothed wheels 5, 7 and 4, 8. Hereupon he removes the piece of meat from the weighing device and both pointers go back into the initial zero position.

There are also other possible forms of construction within the scope of the present invention.

What is claimed is:

1. Apparatus for determining the pickling brine required for pickling meat comprising a weighing device including means for receiving the material to be weighed, a pointer for indicating the actual weight of this material and a mechanism for transmitting the movement of the part of the weighing device for receiving the material to be weighed to said pointer, a second pointer, means connecting the pointers and adapted to increase the distance traversed by the second pointer to the distance traversed by the first pointer in the ratio between the weight of fresh meat including the weight of pickling brine required for preserving the meat and the weight of fresh meat before the introduction of the pickling brine, and devices for rendering the said means and second pointer ineffective during the introduction of the brine.

2. Apparatus for determining the pickling brine required for pickling meat comprising a weighing device including means for receiving the material to be weighed, a pointer for indicating the actual weight of this material and a mechanism for transmitting the movement of the part of the weighing device for receiving the material to be weighed to said pointer, a second pointer, transmission members between said pointers, the transmission members also imparting movement to the second pointer the ratio of which movement to the movement of the first pointer is the ratio of the weight of the meat and brine to the weight of the meat alone, and means for disengaging said transmission members during the introduction of the brine.

3. Apparatus for automatically indicating the weight of the pickling brine to be supplied to meat for the purpose of pickling the same, said apparatus comprising a revoluble spindle, a pointer mounted on said revoluble spindle, means for moving said spindle to bring the pointer into different positions corresponding to different weights of meat, a sleeve revolubly mounted on said spindle, a pointer on said sleeve, and transmission means for driving said sleeve from said spindle, said transmission means being arranged to drive the second pointer at a rate which bears the same ratio to the rate of movement of the first pointer as the combined weights of the brine and meat bear to the original weight of the meat, and means for disengaging and engaging said transmission means.

4. Apparatus for automatically indicating the weight of the pickling brine to be supplied to meat for the purpose of pickling the same, said means comprising a revoluble spindle, a pointer mounted on said revoluble spindle, means for moving said spindle to bring the pointer into different positions corresponding to different weights of meat, a sleeve revolubly mounted on said spindle, a second pointer on said sleeve, and toothed wheel gearing for driving said sleeve from said spindle, said toothed wheel gearing having a transmission means being arranged to drive the second pointer at a rate which bears the same ratio to the rate of movement of the first pointer as the combined weights of the brine and meat bear to the original weight of the meat, and means for disengaging and engaging said transmission means.

5. Apparatus for automatically indicating the weight of the pickling brine to be supplied to meat for the purpose of picking the same, comprising a revoluble spindle, a pointer mounted on said revoluble spindle, means for moving said spindle to bring the pointer into different positions corresponding to different weights of meat, a sleeve revolubly mounted on said spindle, a pointer on said sleeve, and toothed wheel gearing for driving said sleeve from said spindle, said toothed wheel gearing being arranged to drive the second pointer at a rate which bears the same ratio to the rate of movement of the first pointer as the combined weights of the brine and meat bear to the original weight of the meat, and rod and lever mechanism for disengaging and engaging said toothed wheel gearing.

6. In a scale for indicating a constant percentage added to a varying weight, comprising supporting means for the material to be weighed, a scale beam operatively connected to said supporting means, a spindle operatively connected to said beam and having a pointer thereon, a sleeve on said spindle and a second pointer on said sleeve, multiplying gearing transmitting the motion of said spindle to said sleeve, a scale over which said second pointer moves, the space between the said pointers increasing in the ratio of the multiplying gearing from no weight to the limit of the scale and means for disengaging said gearing.

7. The device as defined in claim 6 in which there is a second scale of uniform divisions over which the first pointer moves to indicate the weight in the supporting means.

CHARLOTTE BEISSER,
*Administratrix of the Estate of Georg Beisser, Deceased.*